United States Patent

[11] 3,576,400

[72] Inventor Heinz Schluter
Langenhorn, Germany
[21] Appl. No. 704,460
[22] Filed Feb. 9, 1968
[45] Patented Apr. 27, 1971
[73] Assignee International Standard Electric Corporation
New York, N.Y.
[32] Priority Mar. 1, 1967
[33] Germany
[31] ST 26,567

[54] CALL TRANSFER CIRCUIT FOR PHONE EXCHANGE SYSTEMS
14 Claims, 3 Drawing Figs.

[52] U.S. Cl. .......... 179/18
[51] Int. Cl. .......... H04m 3/54
[50] Field of Search .......... 179/18.03, 27.24, 27.25

[56] References Cited
UNITED STATES PATENTS

| | | | |
|---|---|---|---|
| 1,760,823 | 5/1930 | Friendly .......... | 179/18 |
| 2,274,760 | 3/1942 | Wicks .......... | 179/18 |

*Primary Examiner*—Kathleen H. Claffy
*Assistant Examiner*—David L. Stewart
*Attorneys*—C. Cornell Remsen, Jr., Rayson P. Morris, Percy P. Lantzy, J. Warren Whitesel and Delbert P. Warner

ABSTRACT: An arrangement is provided making it possible to transfer or forward calls received by one subscriber for reception by another subscriber. Means are provided by which the first subscriber is able to arrange to transfer or forward subsequent calls by dialing an appropriate code and also for assuring that only authorized call transfers are made. Call forwarding is achieved by changing the relationship between the directory number and equipment number in a translator by use of a control circuit.

INVENTOR

HEINZ SCHLUTER

BY Delbert A. Warner

ATTORNEY

CALL TRANSFER CIRCUIT FOR PHONE EXCHANGE SYSTEMS

This invention relates to an arrangement for providing a call transfer or call forwarding circuit in telecommunication and particularly telephone exchange systems having a centrally controlled switching network. In particular embodiments, final equipment is connected via a data wire through which, by the central control, the position number (equipment number), the call number (directory number) and the class-of-service of the respective connection can be derived by means of identification pulses and translation means at the points of the data wire, individually associated to the subscribers, and led to the central control unit via a common information channel. Such a system permits in a simple way to provide at each phase of connection all information items required for the control process to be just initiated with the aid of simple access means.

In telephone systems the designation "call transfer circuit" or "call forwarding circuit" is known as a variation in telephone operations, permitting a calling subscriber to influence his subscriber circuit in such a way that further arriving calls are redirected to another subscriber to whom the first subscriber wants to pay a visit.

In known telephone exchange systems a number of central storage and translation means are known which must be interrogated, in case of terminating calls. If such an order exists the control information is changed accordingly. It may be gathered from these explanations that such transfers of calls reduce the speed of the control processes and moreover require a considerable expenditure in control means.

It is an object of the present invention to provide an arrangement for a call transfer circuit in telecommunication, and particularly in telephone exchange systems with a centrally controlled switching network. A central network in such arrangements connects the final subscriber equipment via a connectable data wire through which the position number, the call number and the class-of-service of the respective subscriber circuit can be derived from the central control by means of identification pulses. Translation means are supplied at the connection points of the data wire, individually associated to the subscribers and led to the central control unit via a common information channel, to enable the call transfer circuit to be designed with little cost and without changing the control method or process. This is achieved in such systems in that connection points, individually associated with the subscribers, of the data wire are connected via a call transfer control unit of those subscribers authorized for such a call transfer, in which unit, depending on an information dialed by the calling subscriber and stored there, and marking the subscriber to be called, the association between the own call number of said call subscriber and the position number can be changed accordingly. Thereby a firm association between a call number and a position number, furnishing the setting information, can be changed by the subscriber himself, if so required. Consequently, always distinct control information items are obtained, even if a subscriber reroutes its subscriber circuit to another telephone set. The principle of controlling with the simple gaining of information items for the control processes in all phases of connection can be maintained unchanged.

Details of the arrangement according to the invention may be gathered from the following description of an example and the claims.

The invention is in detail explained with the aid of drawings, wherein.

Figure 1:
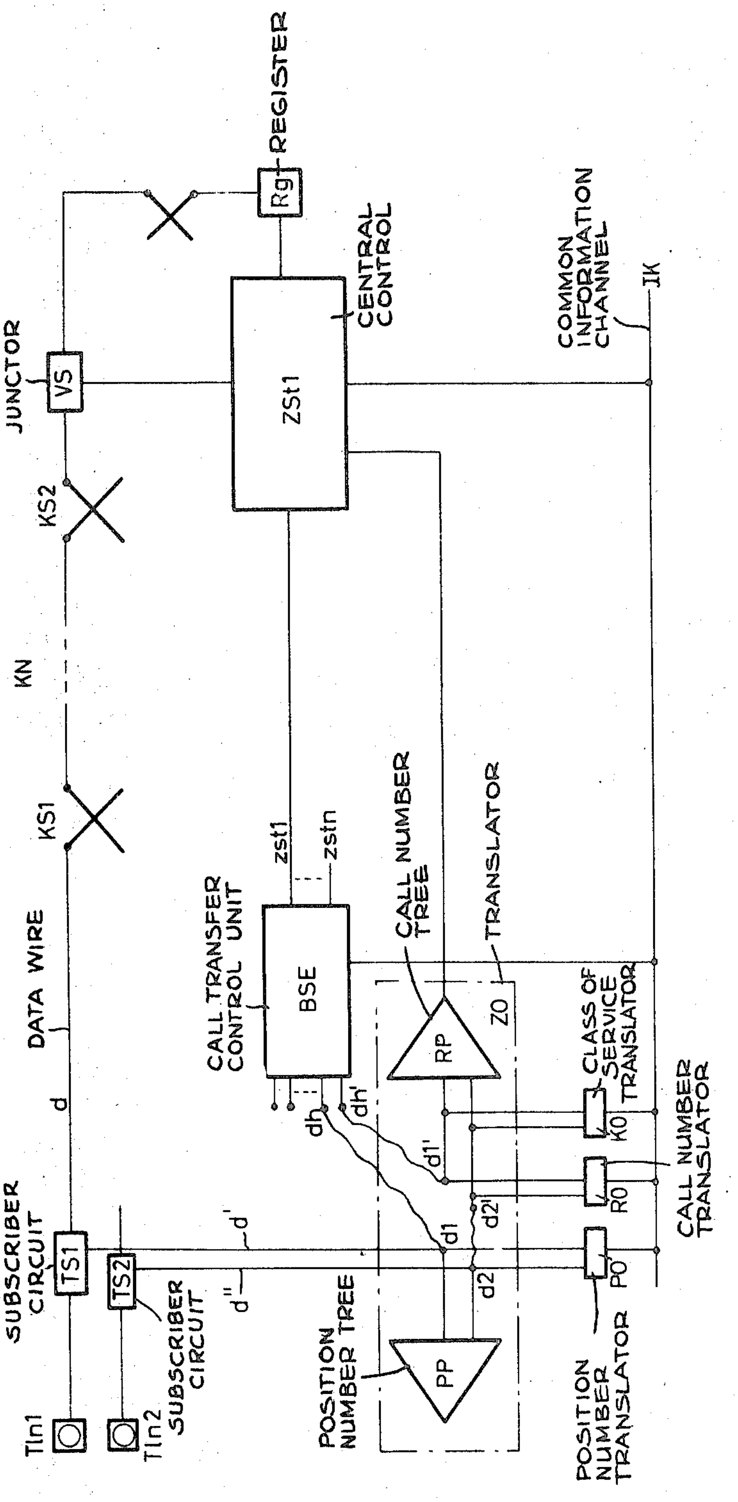
FIG. 1 shows a functional diagram of an arrangement according to the invention.

FIG. 1 schematically shows the arrangement according to the invention. When establishing a connection via the switching stages KS1 and KS2 of the switching grid KN a data-wire *d* is through-connected in parallel to the speech wires and/or control-wires, over which data-wire a connection is established between the junctor VS, the subscriber circuit TS1 or TS2 respectively and all facilities participating in such a connection. The central control ZS*t*l, e.g. a marker, thus has access to the subscriber circuit, to the junctor and to all other facilities participating in the connection via suitable means, such as scanner, translator, register connector, etc. This also applies, if the central control ZS*t*l directly actuates the subscriber circuit via the position-number tree PP or via the call-number tree RP.

The subscriber-individual points of the data-wire *d*, *d'*, *d''* are interconnected at a jumpering grid corresponding to the translations between the call numbers and the position numbers as indicated on the drawing by the jumpering connection *d*2–*d*2' at the subscriber-individual point *d*2 of the position-number tree PP and of the position-number translator PO and the subscriber-individual point *d*2' of the class-of-service translator KO, of the call-number translator RO and of the call-number tree RP. Independent of which side the identifying pulses reach the data-wire, *d'* or *d''*, the position number, the call number and the class-of-service of the respective subscriber circuit are led to the central control ZS*t*l, via the translation means PO, RO, KO and via the common information channel IK.

If the subscriber wants to give a call transfer, or forward, order for the subscriber circuit TS1, said subscriber (TS1) is connected when initiating a call connection with the register R*g* in a way known per se and indicates his wish by dialing a defined code number. If thereupon the call number of the subscriber with the subscriber circuit TS2 is dialed, it is determined that all calls arriving later on for TS1 must be transferred to TS2.

The firm association between a call number and the position number can now be changed via a call transfer control unit BSE. Each subscriber having the right to transfer calls therefore has access to the call transfer control unit BSE. The data-wire *d*1–*d*1' between the position-number and the call-number translation portion of the translator can be separated in the call transfer control unit BSE, if so required.

As long as no call transfer order exists for the subscriber with the subscriber circuit TS1 both subscriber-individual points *d*l and *d*l', being looped via *dh* and *dh'* of the call transfer control unit BSE, are interconnected. If in this condition the subscriber Tl*n*l is called then the call-number tree RP is set via the register R*g* and the central control ZS*t*l and, with the identifying pulse across said tree, via the points *d*l', *dh'*, *dh*, *d*l of the data-wire *d* and, via the position-number translator PO, the position-number of the subscriber Tl*n*l is derived. The central control ZS*t* can take via the information channel IK the corresponding information to establish a connection. But, it is also possible to leave the connection between *d*l and *d*l' established and to connect the call transfer control unit BSE in parallel to the point corresponding to the called number. Then the position number of the subscriber *t*l*n*2, stored in the call transfer control unit BSE, is forwarded to a separate multiple of the information channel IK and the central control ZS*t* evaluates, upon the identification, to which position a connection must be established.

If a call transfer or forward order is given, the central control ZS*t*l applies an identifying pulse to the point *d*l via the junctor VS, seized by the subscriber Tl*n*l, via the switching network KN and via the subscriber circuit TS1, which identifying pulse also reaches thus the input of the call transfer control unit BSE. Simultaneously the identifying pulse is forwarded directly to the call transfer control unit BSE. Because only one central control device can have seized the call transfer control unit, said unit marks, due to the coincidence of both identifying pulses, the input of the subscriber circuit Tl*n*l to be switched over. Thereupon the central control actuates the translator ZO which establishes with the call number of the subscriber Tl*n*2 the call-number tree RP. Thereupon the central control ZS*t*l identifies the subscriber Tl*n*2 via the call-number tree RP and the position-number of said subscriber reaches the information channel IK via the position-number translator PO. At the same time the identifying pulse reaches, via the wire *zstl*, also the call transfer control unit BSE which thereupon receives the position number in storage means thus translating it to the previously marked input for the subscriber Tl*n*l. Thereupon the connection between the subscriber Tl*n*l and the subscriber Tl*n*2 can be established via the central control ZS*t*l. The subscriber Tl*n*l can announce to the subscriber Tl*n*2 the call transfer.

If in this condition the subscriber Tl*n*l is called then the position number is again searched for via the call-number tree RP, in order to establish the connection. The data-wire *dl'* leads to the storage means of the call transfer control unit BSE, which storage means hold the position-number of the subscriber Tl*n*2 and forward this position number to the information channel IK when being actuated by the identifying pulse. The data-wire *dh*, leading to the position-number translator PO, and *dl* is thereby disconnected from the points *dh'* and *dl'*. The connection, originally determined for the subscriber Tl*n*l, is thus transferred to the subscriber Tl*n*2 as desired.

If the subscriber Tl*n*l wants to cancel the call transfer, said subscriber again dials the defined code number into the register R*g*. As during establishing the connection from the subscriber circuit TS1 to the register R*g* via the junctor VS, it has already been identified that the subscriber Tl*n*l is connected to the call transfer control unit BSE, the central control ZS*t* again applies the identifying pulse which appears on the data-wire at the point *dl* and at the call transfer control unit BSE via the wire *zstl*. Due to the coincidence of these identifying pulses the information, associated to the input *dh–dh'* (position-number of the subscriber Tl*n*2) is cancelled and the points *dl* and *dl'* are again interconnected. In case of calls arriving thereupon, again the position-number of the subscriber Tl*n*l is derived.

The call transfer can also be initiated out of an established connection. In such a case the subscriber Tl*n*l only dials the defined code number without previously releasing the established connection. The register R*g* receives said code number and the processes are carried out as described above. The central control ZS*t*l applies the identifying pulse to the side of the junctor VS directed towards the subscriber Tl*n*2. Via the subscriber-individual point *d*2 and via the position-number translator PO the position number of the subscriber Tl*n*2 is gained and taken over, as described above, by the call transfer control unit BSE for the subscriber Tl*n*l.

Figure 2:
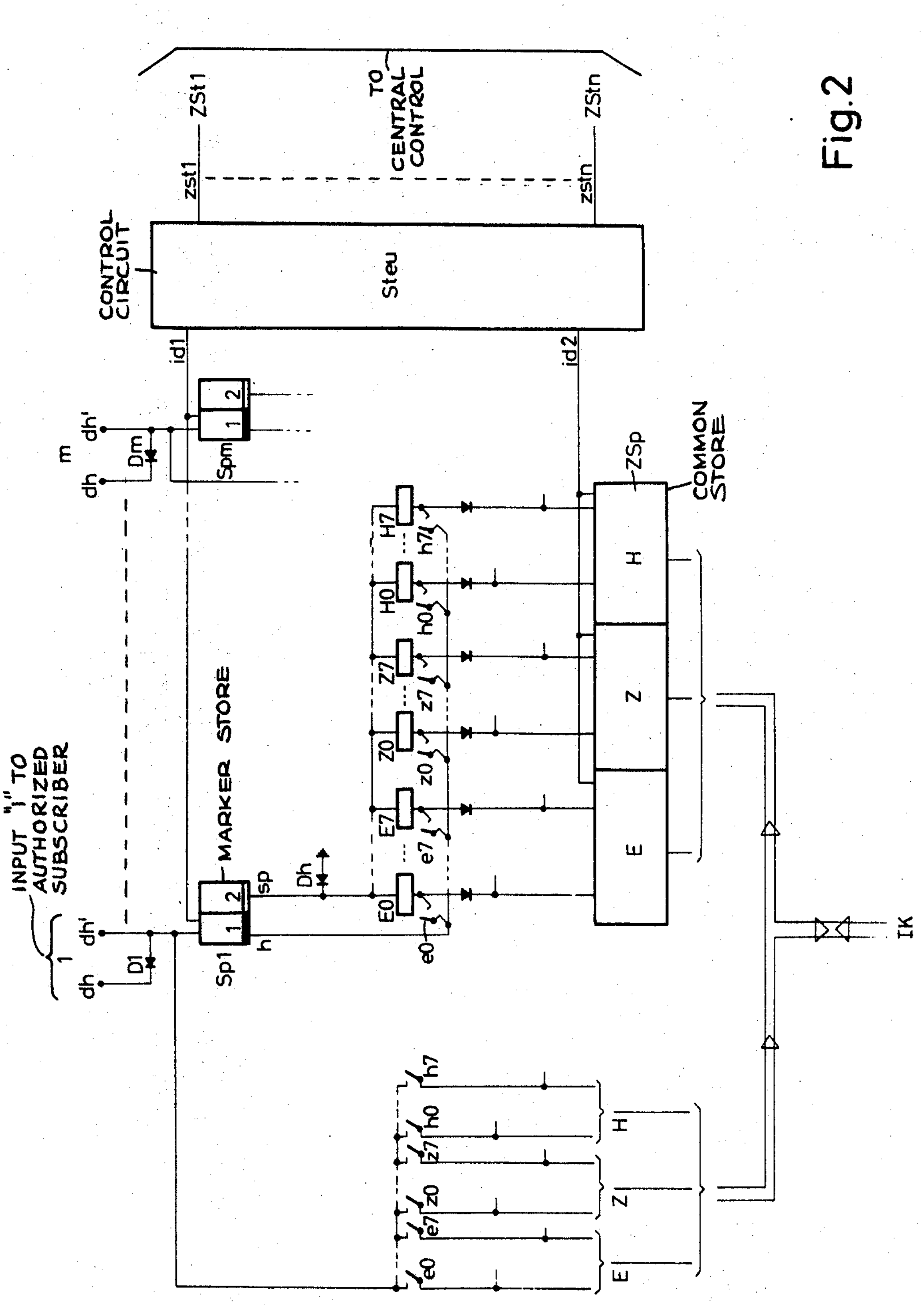
FIG. 2 shows the design of a call transfer control unit for small systems.

FIG. 2 shows a call transfer control unit for a telephone system in which only a few subscribers have the right to establish such call transfers. If a system possesses several control groups with central control facilities ZS*t*l to ZS*tn*, then a control circuit S*teu* takes care that always only one central control unit is connected to the call transfer control unit. To mark the storage means EO...E7, ZO...Z7 and H0...H7, associated to a subscriber, a marker-store S*p*l to S*pm* is provided. This store means S*p*l responds, if, via the data-wire *dh* and via the wire *idl*, an identifying pulse arrives simultaneously. To each of the authorized subscribers one of the *m* inputs with the mark-store means and the information store means is firmly associated. The information store means EO...E7, ZO...Z7, HO...H7 which are set digit by digit e.g. in the two-out-of-five code are marked on one side by the marker-store S*p*l to S*pm*, while on the other side the information prevailing on the information channel IK is used for setting. The information can be cancelled again via the marker-store, if the holding circuit *h* for the storage means is interrupted. When identifying the subscriber Tl*n*2 a common store ZS*p* receives the position-number. If the identifying pulses of the central control ZS*t*l are applied via the wires *zstl* and *id*2, then the store-relays of the call transfer control unit are set, which relays are marked by the actuated marker-store.

With a resetting pulse via the wires *idl* and *id*2, the contents of the marker-store S*p*l to S*pm* and the contents of the common store ZS*p* are cancelled. At point *dh'* the position-number of the subscriber Tl*n*2 is applied to the information channel IK via the contacts *e*0....*e*7, *z*0....*z*7, *h*0....*h*7 of the store-relays. When identifying the subscriber Tl*n*l at point *dh'* the position-number of the subscriber Tl*n*2 is applied to the information channel IK in case of arriving calls.

In the nonoperative condition the points *dh* and *dh'* are interconnected via a diode D1 to D*m* in the example shown in FIG. 2. The storage means, firmly associated with the subscriber, are thereby used in order to store the position-number of the subscriber in the nonoperative condition, entered in a same process. The diode D1 to D*m* thereby prevents the identification pulse with e.g. negative potential from passing through to the point *dh* and thus to the position-number tree PP and the position-number translator PO. In case of outgoing connections the identifying pulse, arriving from the point *dh* however can pass through to the class-of-service translator KO and to the call-number translator RO.

Figure 3:
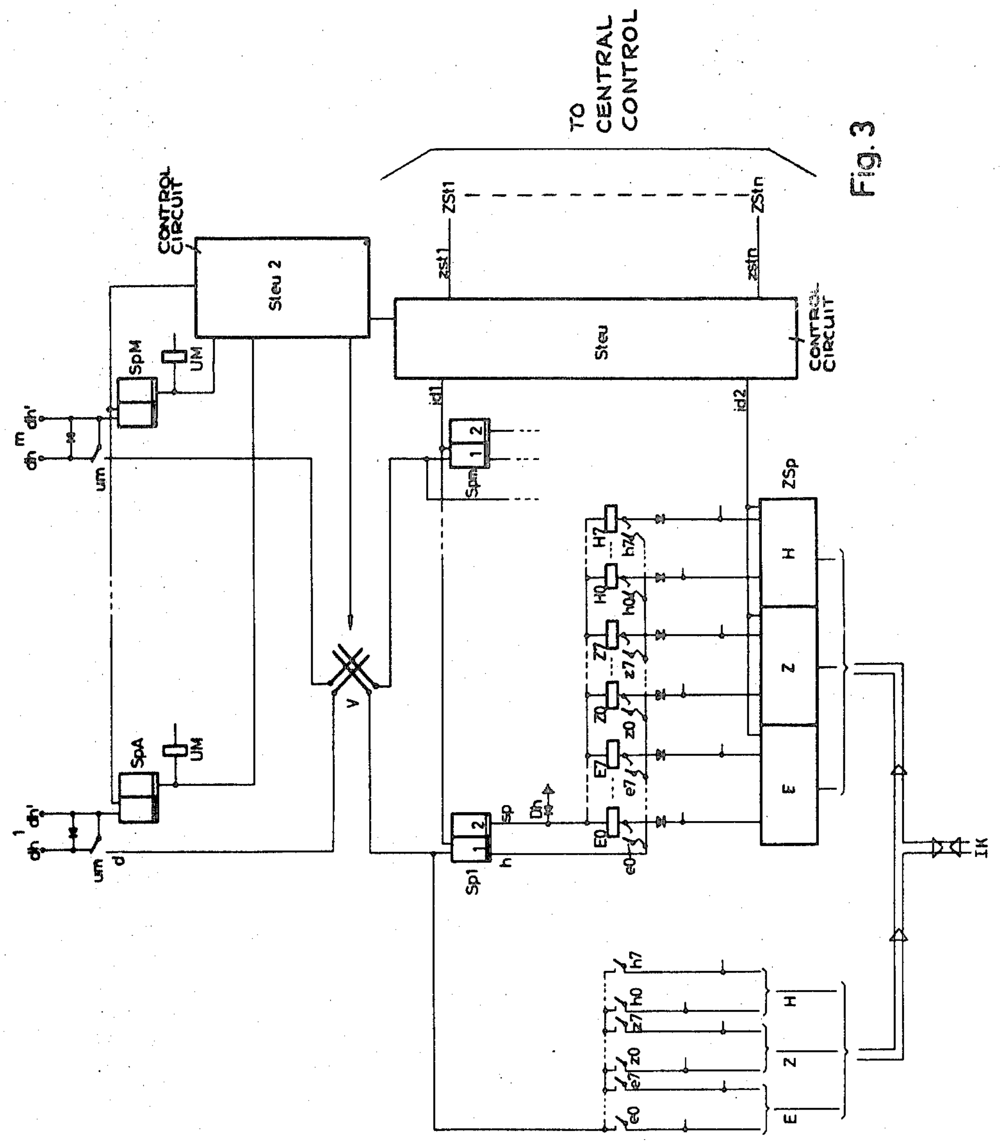
FIG. 3 shows the design of a call transfer control unit for larger systems.

The call transfer control unit according to FIG. 3 is suited for telephone exchange systems in which many subscribers have the right to transfer calls to other telephone stations. Setting and cancelling of the contents of the storage means in the call transfer control unit is substantially the same as described in the example shown on FIG. 2. The chief difference is that the storage means are no longer firmly associated with the subscribers, but are only connected via a connector V and are seized only during such a call transfer. The initiating identification is performed in the same way via the firmly associated marker-store means S*p*A to S*p*M. This marker-store triggers and actuates the relay UM which connects the point *dh'* with the connector V via contact *um* and via the wire *d*. Simultaneously the marker-store S*p*A to S*pm* actuates the control circuit S*teu*2 which thereupon connects this wire *d* with one of the stores Spl to *spm* with the aid of the store-relays EO...E7, ZO...Z7, HO...H7. The further process is the same as already described with the exception that the relays are disconnected, at the end of the call transfer, again from the marker-store S*p*A to S*p*M of the input. The contact *um* bridges the diode in the data-wire *dh*, *dh'*. The marker-stores S*p*A to S*p*M remain triggered during the call transfer.

In order to clearly define the subscriber circuits during the switch-over (disconnection of the position-number hitherto used, writing in of the new position-number), if other central control facilities of other control groups interrogate these subscriber circuits, an identification can be applied during this time in the call transfer control unit, marking this switch-over condition.

While the principles of the invention have been described above in connection with specific apparatus and applications, it is to be understood that this description is made only by way of example and not as a limitation on the scope of the invention.

I claim:

1. An arrangement for providing a call forwarding circuit in telecommunication and particularly telephone exchange systems comprising a centrally controlled switching network which connects a calling subscriber to called subscriber equipment via means including a connectable data-wire, said means including connection points through which the position number, the call number and the class-of-service of the respective subscriber circuit can be derived from a central control unit by means of identification pulses and translation means, said connection points being individually associated to the subscribers and connected to the central control unit via a common information channel, means for connecting the connection points via a call transfer control unit to individual subscribers authorized for call transfers, said call transfer control unit including storage means for information dialed by the calling authorized subscriber for marking the subscriber to which incoming calls are to be transferred, whereupon in the call transfer control unit in the association between call number and position number the position number of the said authorized subscriber is changed to the position number of the subscriber to which incoming calls for the authorized subscriber are to be transferred.

2. An arrangement according to claim 1, in which seizure of the call transfer circuit control unit depends on dialing a defined code number.

3. An arrangement according to claim 1, in which in the call transfer circuit control unit the data-wire is disconnectable from a position-number translator on one hand and a call-number and class-of-service translator on the other hand, if a call transfer order exists.

4. An arrangement according to claim 3, in which the disconnection is made via a resistance, the value of which depends on the sense of current to let the identifying pulses pass from the position-number translator to the call-number translator and class-of-service translator.

5. An arrangement according to claim 4, in which if a call transfer order exists, the subscriber-individual connection point in the call-number and class-of-service translator is connectable to the common information channel via storage means in the call transfer control unit for determining the position-number and call-number of the subscriber to be called.

6. An arrangement according to claim 5, in which in systems with a plurality of control groups, control is secured via a control circuit, and only one control unit is connected to the call transfer circuit control unit.

7. An arrangement according to claim 6, in which a storage unit in the call transfer control unit is associated with each subscriber authorized to use the call transfer and that seizure of such a storage unit in the call transfer circuit control unit is in response to a pulse via the associated subscriber-individual connection point and of an identifying pulse from the central control.

8. An arrangement according to claim 7, in which, a call transfer order into the call transfer control unit is stored in the class-of-service translator for the respective subscriber.

9. An arrangement according to claim 8, in which when a connection is established by a subscriber after dialing the defined code number, the call transfer control unit is again actuated and the contents of the associated marker-store are cancelled.

10. An arrangement according to claim 9, in which initiation of a call transfer order is made at an existing connection by the defined code number, whereby the data-wire leading to the subscriber selected for the call transfer and the call transfer control unit receives an identification pulse on the central control and the position number of said subscriber is stored in storage means in the call transfer control unit.

11. An arrangement according to claim 10, in which the subscriber-individual connection points are connectable with storage means via a connector during such a call transfer order.

12. An arrangement according to claim 11, in which identification for said subscriber is applied in the call transfer control unit.

13. An arrangement according to claim 1, in which the call transfer control unit is connected to the called connection points of the subscribers, the position-number of a subscriber to be called is stored in the call transfer control unit and is forwarded to a separate multiple of the information channel, and the central control selects the identification of the calling subscriber.

14. An arrangement according to claim 13, in which in case of subscriber-individual storage means, the position-number of the subscriber (T11) is stored in the call transfer control unit in the nonoperative condition.